April 11, 1944.　　G. W. ANDERSON　　2,346,546
DEEP HOLE DRILL
Filed Jan. 23, 1942
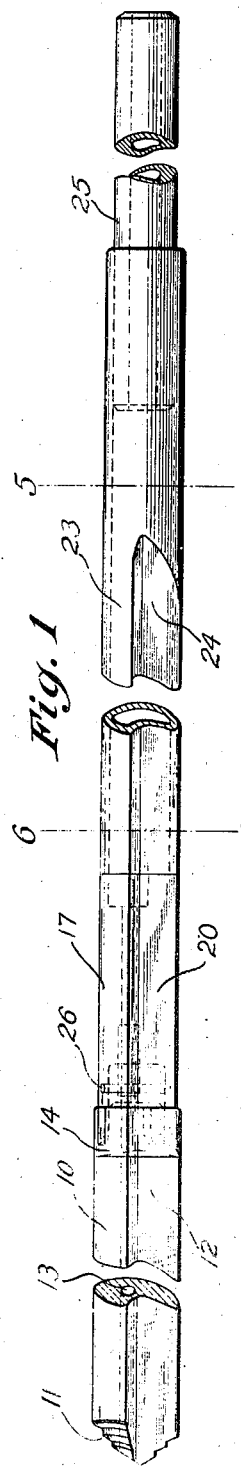
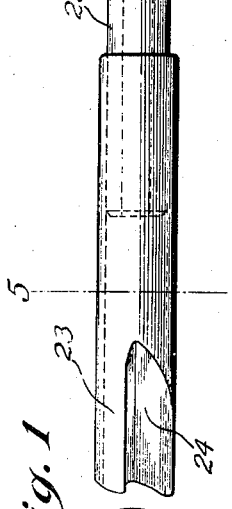
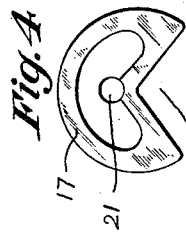
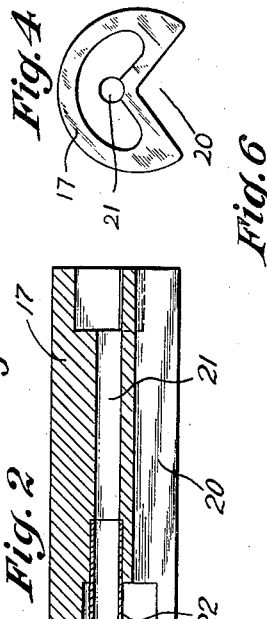
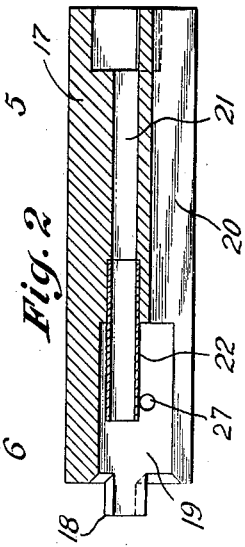
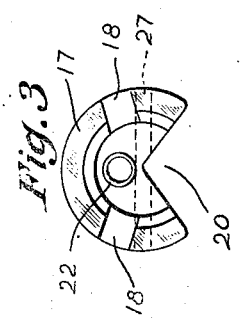
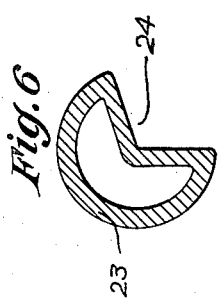
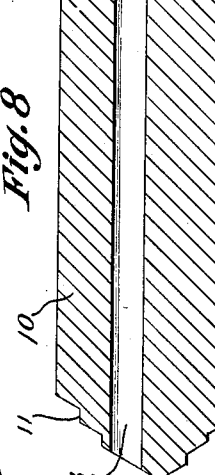
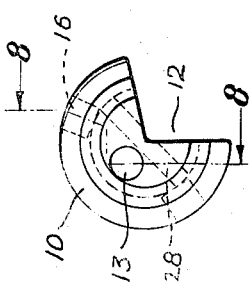
INVENTOR
Gustaf W. Anderson
BY Joseph J. Schofield
ATTORNEY Patented Apr. 11, 1944

2,346,546

UNITED STATES PATENT OFFICE 2,346,546

DEEP HOLE DRILL

Gustaf W. Anderson, Glastonbury, Conn., assignor to Niles-Bement-Pond Company, West Hartford, Conn., a corporation of New Jersey Application January 23, 1942, Serial No. 427,902

1 Claim. (Cl. 77—68)

This invention relates to deep hole drills and particularly to a drill having a replaceable cutting tool detachably attached at its forward end and a continuous oil supplying conduit extending longitudinally from end to end of the drill and also having a chip removing groove extending longitudinally along one side.

An object of the present invention is to provide an elongated or deep hole drill, the cutting surfaces of which are on a cutter member forming one end of the drill detachably attached to an intermediate member forming part of an elongated shank portion.

Another object of the invention is to form the cutting member of the drill with high speed alloy steel cutting surfaces preferably butt-welded to a medium carbon steel at its shank end to facilitate its detachable connection to the intermediate member and shank of the drill.

Another object of the invention is to provide an improved detachable driving and locking connection between the cutter member and shank enabling cutter members to be substituted conveniently and when connected to be rigidly locked to the intermediate member of the shank and positively connected thereto so that it may be driven therefrom.

A still further object of the invention is to provide a small sleeve or bushing in the forward end of the intermediate member extending into the longitudinally extending oil conduit in the cutter portion of the drill through which oil must pass from the shank to the cutter.

With the above and other objects in view the invention includes the features of construction and operation set forth in the following specification and illustrated in the accompanying drawing.

In the accompanying drawing annexed hereto and forming a part of this specification, the invention has been shown embodied in an elongated drill particularly designed for drilling rifle barrels, but it will be understood that the invention can be otherwise embodied and that the drawing is not to be construed as defining or limiting the scope of the invention, the claims appended to this specification being relied upon for that purpose.

In the drawing:

Figure 1 is a longitudinal outside view of a complete drill made in accordance with the present invention.

Fig. 2 is a longitudinal sectional view of an intermediate member forming a part of the complete drill.

Fig. 3 is an end view of the intermediate member taken from the left-hand end of Fig. 2;

Fig. 4 is a similar transverse view of the intermediate member taken from the right-hand end of Fig. 2;

Fig. 5 is a cross sectional view of the shank taken upon the line 5—5 of Fig. 1;

Fig. 6 is a corresponding cross sectional view taken upon the plane of line 6—6 of Fig. 1;

Fig. 7 is a transverse view of the shank end of the cutting member; and

Fig. 8 is a longitudinal sectional view of the cutting member taken on the planes of broken line 8—8.

In the above-mentioned drawing there has been shown but one embodiment of the invention which is now deemed preferable, but it is to be understood that changes and modifications may be made within the scope of the appended claim without departing from the spirit of the invention.

Briefly and in its preferred aspect the invention may include the following principal parts: first, a relatively short cutting member formed of high speed alloy steel or other metal cutting material upon one end of which are formed one or more suitable cutting surfaces, there being a groove extending longitudinally from end to end; second, a short length of medium carbon steel forming a connecting member directly welded to the cutting member; third, a cylindrical extension on said connecting member extending axially, there being two slots or recesses formed in the body portion thereof; fourth, an intermediate member having projections formed to fit the recesses within the shank end of the cutting member and a central longitudinally extending recess into which the tang or projecting portion of the cutting member may enter; fifth, a sleeve inserted within the intermediate member and extending partially into the recess formed in this intermediate member and into the oil conduit within the cutting member; sixth, a tubular section rolled as from a thin-walled cylinder to form a longitudinal groove upon one side alined with the cut-away portion of the cutting member so that oil and chips may be removed from the cutting end of the drill; and seventh, a driving member or sleeve inserted and suitably permanently retained within the tubular shank through which an oil conduit extends.

Referring more in detail to the figures of the drawing, there is shown in Fig. 1 a complete embodiment of the elongated or deep hole drill forming the subject matter of this invention. At the left-hand end of this figure there is shown a cutting member 10 of alloy steel or other high speed metal cutting material having suitable cutting surfaces 11 formed at its free end and provided with a longitudinal groove 12 formed along one side. In addition to this longitudinal groove 12 there is provided an oil supplying conduit or hole 13 extending centrally through the cutting member. Abutting this cutting member 10 and suitably secured thereto as by welding is a short piece of steel 14 of suitable tensile strength and toughness to act as a connecting and driving member for the cutter member 10. This connecting member 14, as shown best in Fig. 8, extends axially from the cutting member 10 and has the same peripheral conformation. Also oil duct 13 continues therethrough in alinement with the oil duct in the cutting member. At the free end of this member is a cylindrical projection 15 and in the body portion are formed spaced recesses 16 suitably milled in the body portion of the connecting member adjacent the projection.

Adapted to be connected to this end of the connecting member 14 is an intermediate member 17 shown in section in Fig. 2. At one end this intermediate member 17 has annularly spaced projections 18 adapted to fit within the recesses 16 formed within the recesses in the connecting member 14. At the same end of this member 17 there is a central recess 19 into which the projection 15 on the connecting member 14 may fit. This intermediate member 17 also has a lateral groove 20 extending along one side in alinement with the groove 12 in the cutting and connecting members and the intermediate member 17 also has a substantially central or axial oil conduit 21 extending longitudinally.

To facilitate the passage of oil from the intermediate member 17 into the connecting member 14 and cutting member 10, a sleeve 22 is fitted into the intermediate member as shown in Fig. 2. This sleeve extends, as will be noted in Fig. 2, into the central recess 19 formed in the intermediate member and when this intermediate member 17 is attached to the connecting member 14 the outer or free end of the sleeve 22, as shown in Fig. 1, will enter the oil conduit within the connecting member 14. By this means the loss of pressure in the oil supply line will be substantially eliminated and oil will be prevented from escaping through the detachable connection between the intermediate member 17 and the connecting member 14. At the opposite end of the intermediate member 17 is a tubular shank portion 23 which may have a groove 24 conforming substantially to that in the intermediate member 17 and cutting member 10 extending longitudinally. The shank 23, as shown, may be made of thin-walled tubing suitably rolled by any preferred method. This shank 23 may be butt-welded to one end of the intermediate member 17.

At the opposite end of the shank 23 a driving member 25 for the drill may be provided, this member entering the opening within the tubular shank and being suitably brazed or welded therein and having an oil groove extending from end to end.

To drivingly connect the intermediate to the cutting and connecting members 10 and 14 and lock these members together, a cross pin 26 is provided. This pin 26 passes through a hole 27 in the walls of the intermediate member adjacent its recessed end and passes substantially centrally through a hole 28 in the projection 15. When locked together the intermediate member is drivingly connected to the cutter and connecting members 10 and 14 by the projection 18 entering the recesses 16.

I claim:

A deep hole drill comprising in combination, a cutter member and an intermediate member detachably connected together, said cutter member and intermediate member having a continuous groove extending along one side and an oil supply conduit extending continuously therethrough, there being a sleeve disposed between said intermediate member and cutter member and forming a part of said conduit.

GUSTAF W. ANDERSON.